United States Patent
Ghanam et al.

(10) Patent No.: US 11,306,758 B2
(45) Date of Patent: Apr. 19, 2022

(54) CONNECTING MEMBER AND CONNECTING METHOD FOR REDIRECTING FLOWABLE MATERIAL

(71) Applicant: Stryker European Holdings I, LLC, Kalamazoo, MI (US)

(72) Inventors: Fadi Ghanam, Scallstadt (DE); Ulrich Melder, Rust (DE); Sascha Kubis, Freiburg (DE)

(73) Assignee: Stryker European Holdings I, LLC, Kalamazoo, MI (US)

( * ) Notice: Subject to any disclaimer, the term of this patent is extended or adjusted under 35 U.S.C. 154(b) by 184 days.

(21) Appl. No.: 16/560,533

(22) Filed: Sep. 4, 2019

(65) Prior Publication Data
US 2020/0072270 A1   Mar. 5, 2020

(30) Foreign Application Priority Data
Sep. 5, 2018 (EP) .................................... 18192685

(51) Int. Cl.
*F16B 11/00* (2006.01)
*F16B 13/14* (2006.01)
*F16B 25/00* (2006.01)

(52) U.S. Cl.
CPC ........ *F16B 13/141* (2013.01); *F16B 25/0068* (2013.01)

(58) Field of Classification Search
CPC ...... F16B 13/141; F16B 11/006; F16B 11/008
(Continued)

(56) References Cited

U.S. PATENT DOCUMENTS

| 752,669 | A | * | 2/1904 | Guzowski | ................. E04B 1/48 403/268 |
| 4,044,798 | A | * | 8/1977 | Feldstein | ............. F16L 55/1116 138/90 |

(Continued)

FOREIGN PATENT DOCUMENTS

| DE | 9419777 | | 2/1995 |
| EP | 0318818 | A1 | 6/1989 |
| WO | WO2016197047 | A1 | 12/2016 |

OTHER PUBLICATIONS

English language abstract not available. However, English language translation for DE9419777 extracted from espacenet.com database on Sep. 3, 2019, 16 pages.

(Continued)

*Primary Examiner* — Flemming Saether
(74) *Attorney, Agent, or Firm* — Howard & Howard Attorneys PLLC (57) ABSTRACT

A connecting member includes a fastening portion configured to be fastened to an object by an adhesive. The connecting member includes at least one supply opening for supplying the adhesive and at least one discharge opening for discharging a part of the adhesive, wherein the at least one supply opening and the at least one discharge opening are arranged outside of a fastening portion or at least outside of a fastening area. A channel connecting the at least one supply opening and the at least one discharge opening is configured to direct the flow of adhesive. The channel includes an open channel portion that at least partly extends on a surface of the fastening portion and that comprises at least one redirecting portion configured to redirect the flow of adhesive between the at least one supply opening and the at least one discharge opening.

14 Claims, 11 Drawing Sheets

(58) Field of Classification Search
USPC .......................................................... 411/82.1
See application file for complete search history.

(56) References Cited

U.S. PATENT DOCUMENTS

| | | | | |
|---|---|---|---|---|
| 4,776,738 | A * | 10/1988 | Winston | .................... F16B 3/005 |
| | | | | 411/101 |
| 4,812,193 | A * | 3/1989 | Gauron | ................. B29C 66/474 |
| | | | | 156/293 |
| 4,941,785 | A * | 7/1990 | Witten | .................... B29C 65/42 |
| | | | | 411/178 |
| 5,087,147 | A | 2/1992 | Petrzelka et al. | |
| 6,902,366 | B2 * | 6/2005 | Ducker, III | ............ F16B 33/004 |
| | | | | 411/258 |
| 8,419,331 | B2 | 4/2013 | Goettlich | |
| 8,439,220 | B2 * | 5/2013 | Norman | ............. F16L 55/1108 |
| | | | | 220/367.1 |
| 10,385,908 | B2 * | 8/2019 | Greegor | ................ F16B 33/004 |
| 2003/0035697 | A1 | 2/2003 | Kubler et al. | |
| 2011/0158741 | A1 * | 6/2011 | Knaebel | ............... B62D 29/008 |
| | | | | 403/265 |
| 2016/0377108 | A1 * | 12/2016 | Cloud | ................... F16B 11/006 |
| | | | | 411/82.1 |
| 2017/0001368 | A1 * | 1/2017 | Czinger | ................. B29C 65/52 |
| 2019/0322055 | A1 * | 10/2019 | Okoli | ................... B62D 27/023 |

OTHER PUBLICATIONS

English language abstract for EP0318818 extracted from espacenet.com database on Sep. 3, 2019 Also see English equivalent U.S. Pat. No. 5,087,147.

International search report for Application No. EP18192685.8 dated Mar. 25, 2019, 9 pages.

* cited by examiner

CONNECTING MEMBER AND CONNECTING METHOD FOR REDIRECTING FLOWABLE MATERIAL

CROSS-REFERENCE TO RELATED APPLICATIONS

This application claims priority to European Patent Application No. 18192685.8, filed Sep. 5, 2018, which is hereby incorporated by reference in its entirety.

TECHNICAL FIELD

The present disclosure generally relates to a connecting member. In particular, a connecting member for establishing a connection between a first object and at least one second object is presented.

BACKGROUND

A connecting member for establishing a connection between two objects can be fastened to a first one of the objects by means of an adhesive. The connecting member comprises a further portion for attaching a second one of the objects to the connecting member so that a connection is established between the two objects by means of the connecting member. In addition to the fastening the first object to the connecting member by means of the adhesive, the connecting member thus comprises a further connecting structure like a threaded portion to fasten the second object to the connecting member.

Such connecting members are, for example, disclosed in U.S. Pat. No. 8,419,331 B2. U.S. Pat. No. 8,419,331 B2 discloses a composite anchor bolt having a tapered tip for facilitating the introduction of the anchor bolt into a borehole. The anchor bolt has thread turns arranged parallel to each other at the shaft of the anchor bolt. The anchor bolt is screwed into the borehole which is provided with a quantity of glue. The glue becomes distributed between the bolt and a wall of the borehole.

SUMMARY

There is a need for a connecting member that improves the fastening of the connecting member to an object by means of an adhesive.

According to one aspect of the present disclosure, a connecting member is provided. The connecting member comprises a fastening portion configured to be fastened to an object by means of an adhesive. The fastening portion comprises a fastening area configured to come into contact with the object to be fastened. The connecting member further comprises at least one supply opening for supplying the adhesive and at least one discharge opening for discharging a part of the adhesive, wherein the at least one supply opening and the at least one discharge opening are arranged outside of the fastening portion or at least outside of the fastening area. A channel connects the at least one supply opening and the at least one discharge opening and is configured to direct a flow of the adhesive. The channel comprises an open channel portion that at least partly extends on a surface of the fastening portion and that comprises at least one redirecting portion configured to redirect the flow of adhesive between the at least one supply opening and the at least one discharge opening.

The connecting member may have an axial extension. The redirecting portion may be located on the same side (e.g., to the left or to the right) of the at least one supply opening and of the at least one discharge opening with respect to the axial extension of the connecting member.

The redirecting portion may be located at or close to an axial end of the axial extension of the connecting member. The at least one supply opening and the at least one discharge opening may be arranged offset from the axial end of the axial extension of the connecting member, at which the redirecting portion is located. The at least one supply opening and the at least one discharge opening may be displaced relative to the redirecting portion by the same offset. The at least one supply opening and the at least one discharge opening may be arranged at a centrally located portion of the axial extension of the connecting member.

The at least one open channel portion may have at least one portion having a particular geometrical shape configured for leading the adhesive along the outer surface of the fastening portion. Such a portion may have, for example, a meandering or thread-like shape. The at least one open channel portion may have at least one helical portion. A first helical portion may be connected to the at least one redirecting portion. The first helical portion may extend in a direction of the at least one supply opening. The first helical portion may direct the flow of the adhesive coming from the at least one supply opening to the at least one redirecting portion.

Alternatively or in addition to a helical portion, the open channel portion may comprise at least one meandering portion. The meandering portion may include straight sections and curved sections connecting at least two straight sections with each other. The straight sections may extend in a direction of the longitudinal axis of the fastening portion. The straight sections may extend substantially parallel to the longitudinal axis of the fastening portion. The straight sections may extend substantially parallel to each other. Each of the curved sections may be arranged at or close to one of the axial ends of the fastening portion. The curved sections may have a U-shape.

The curved sections may be configured to direct the flow of adhesive coming from one straight section into the next straight section. In other words, the curved sections are arranged and configured to redirect the flow of adhesive. Each of the curved sections forms a redirecting portion. The adhesive coming from the at least one supply opening may, for example, flow through a straight section of the meandering portion and from this straight section into the curved section. The curved section directs the flow of adhesive into the next straight section, which is in turn connected by a curved section to the next straight section. The flow direction of the flow of adhesive in two neighbouring or subsequent straight sections may be opposite.

A second helical portion may be connected to the at least one redirecting portion. The second helical portion may extend in a direction of the at least one discharge opening. The second helical portion may direct a flow of the adhesive coming from the redirecting portion in direction of the at least one discharge opening.

The at least one open channel portion may extend on an outer circumferential surface of the fastening portion. The at least one open channel portion may extend on an inner or an outer circumferential surface of the fastening portion. The circumferential surface may be defined by a cylindrical body or space of any cross-sectional form (e.g., of a circular cross-sectional form).

The connecting member may be fastened to objects having different shapes and/or dimensions. Depending on the shape and/or dimensions of the object, to which the connecting member should be fastened, the at least one open channel portion may be configured to extend on an outer circumferential surface of the fasting portion or an inner circumferential surface of the fastening portion. In case that the open channel portion extends on an outer circumferential surface, the fastening portion may be inserted into the object for fastening the connecting member to the object. On the other hand, in case the open channel portion extends on an inner circumferential surface, a portion of the object, to which the connecting member should be fastened, may be received within the fastening portion of the connecting member.

The at least one channel may include a first internal channel portion and a second internal channel portion. The first internal channel portion and the second internal channel portion may extend within the body of the connecting member. The first internal channel portion may connect the at least one supply opening to the open channel portion. The second internal channel portion may connect the at least one open channel portion and the at least one discharge opening.

The first internal channel portion and the second internal channel portion may each have a section extending substantially radially inwardly starting from the at least one supply opening and the at least one discharge opening, respectively. The first internal channel portion and the second internal channel portion each may have a second section connected to the first section, which second section may extend substantially outwardly in radial direction. The second section may connect the first section of each of the at least one first internal channel portion and the second internal channel portion with the at least one open channel portion.

The at least one redirecting portion may have a shape configured to redirect the flow of the adhesive. In one variant, the redirecting portion may have a V-shape. In another variant, the redirecting portion may have a U-shape.

The at least one supply opening and the at least one discharge opening may be arranged in a direction of a longitudinal of the fasting portion and/or in radial direction outside of the fastening portion. The at least one supply opening and the at least one discharge opening may be included in at least one plane. This plane may extend perpendicular to a longitudinal axis of the fastening portion. The at least one plane may be displaced relative to the redirecting portion. The at least one plane and the redirecting portion may be displaced by a particular distance in a direction of the longitudinal axis of the fastening portion. The at least one plane may be spaced apart from the fastening portion. Thus, the at least one plane may extend in a direction of the longitudinal axis of the fastening portion outside of the fastening portion.

The at least one supply opening and the at least one discharge opening may be separated from the fastening portion by a step-like portion. The step-like portion may define an abutment surface for an abutment of the object to be fastened to the fastening portion of the connecting member. The fastening portion may have a cylindrical shape. The fastening portion may be configured to be connected to an object having a rod-, duct- or a tube-like shape. The fastening portion may have an opening extending in axial direction to the fasting portion. Therefore, the fastening portion may be hollow.

The connecting member may comprise a vent hole. The vent hole may be connected to a vent channel extending at least partly through the fastening portion. The vent hole may be arranged in the step-like portion separating the at least one discharge opening and the at least one supply opening from the fastening portion. The vent hole may have an angular offset to the at least one supply opening and/or the at least one discharge opening, which may be arranged at the step-like portion as well. The vent hole may be connected to an inner space defined by the hollow fastening portion.

The connecting member may comprise an attachment portion for attachment of an object to be connected to the other object by means of the connecting member. The attachment portion may comprise an attachment opening for receiving at least a portion of the other object. The attachment portion may extend in an angled manner with respect to the fastening portion. The attachment portion may be connected to the step-like portion separating the at least one supply opening and the at least one discharge opening from the fastening portion.

The fastening area may be formed by the inner circumferential surface or the outer circumferential surface of the fastening portion. The at least one supply opening and the at least one discharge opening may be formed at an outer circumferential surface of the fastening portion. The at least one supply opening and the at least one discharge opening may be included in one plane or along one straight line. The plane or line may extend perpendicularly to a longitudinal axis of the fastening portion. The at least one supply opening and the at least one discharge opening may be arranged in radial direction of the fastening portion outside of the fastening area.

According to a second aspect of the present disclosure, a method for connecting the connecting member as described above with an object by means of an adhesive is provided. The method comprises the steps of arranging the fastening portion of the connecting member at the object such that the at least open channel portion is covered by a surface by the object to form a closed channel portion, of supplying the adhesive via the at least one supply opening to the at least one channel of the connecting member, wherein the adhesive flows through the first internal channel portion, the closed channel portion and the second internal channel portion to the at least one discharge opening, wherein the adhesive in the open channel portion comes into contact with both, the connecting member and the object, to establish an adhering connecting between the connecting member and the object, and of stopping supply of the adhesive when the adhesive leaks out of the at least one discharge opening.

BRIEF DESCRIPTION OF THE DRAWINGS

Further details, advantages and aspects of the present invention will become apparent from the following embodiments taken in conjunction with the drawings, wherein.

DETAILED DESCRIPTION

In the following description, exemplary embodiments of a connecting member and a method for connecting the connecting member to at least one object by means of an adhesive will be explained with reference to the attached drawings. The same or similar reference numerals will be used to denote the same or similar structural features.

Figure 1:
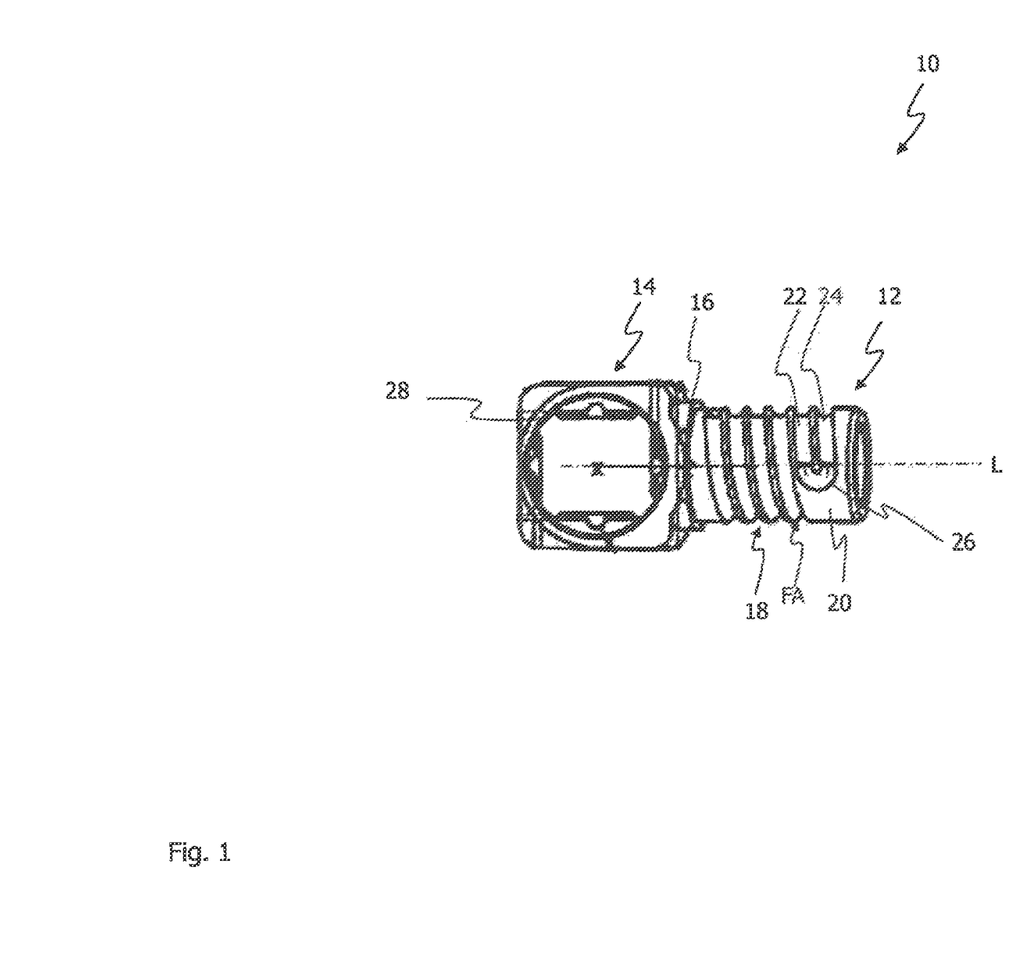
FIG. 1 shows a front view of a connecting member according to a first embodiment.

FIG. 1 shows a front view of a connecting member 10 according to a first embodiment. The connecting member 10 comprises a fastening portion 12 to be fastened to a first object (not shown) by means of an adhesive. The connecting member 10 further comprises an attachment portion 14 for attachment of a second object (not shown) to be connected to the first object by means of the connecting member 10. The fastening portion 12 and the attachment portion 14 are in the present embodiment interconnected by a step-like portion 16. In other embodiments, the step-like portion 16 may be omitted or replaced by one or more other interconnecting portions.

The fastening portion 12 has a cylindrical shape with an essentially circular cross-section. The fastening portion 12 comprises a fastening area FA, which is configured to come into contact with the object to be fastened. The fastening area FA is formed by the outer circumferential surface 20 of the fastening portion 12. An open channel portion 18 representing a portion of a channel for directing the flow of adhesive extends on the outer circumferential surface 20 of the fastening porting 12. The open channel portion 18 comprises a first helical portion 22 and a second helical portion 24 (similar to a double thread). The first helical portion 22 and the second helical portion 24 are connected by a redirecting portion 26. The redirecting portion has a U-shape. The first helical portion 22 leads the flow of adhesive coming from the step-like portion 16 to the redirecting portion 26. The second helical portion 24 directs the flow of adhesive from the redirecting portion 26 in the direction of the step-like portion 16.

The attachment portion 14 comprises an attachment opening 28. The attachment opening 28 is configured to receive a portion of the second object (not shown) to be connected by the connecting member 10 to the first object (not shown). It will be appreciated that the attachment portion 14 could have any desired configuration for connecting the second object thereto. As an example, the attachment portion 14 could alternatively be configured as a threaded rod or threaded bore to receive a corresponding counter-thread of the second object.

Figure 2:
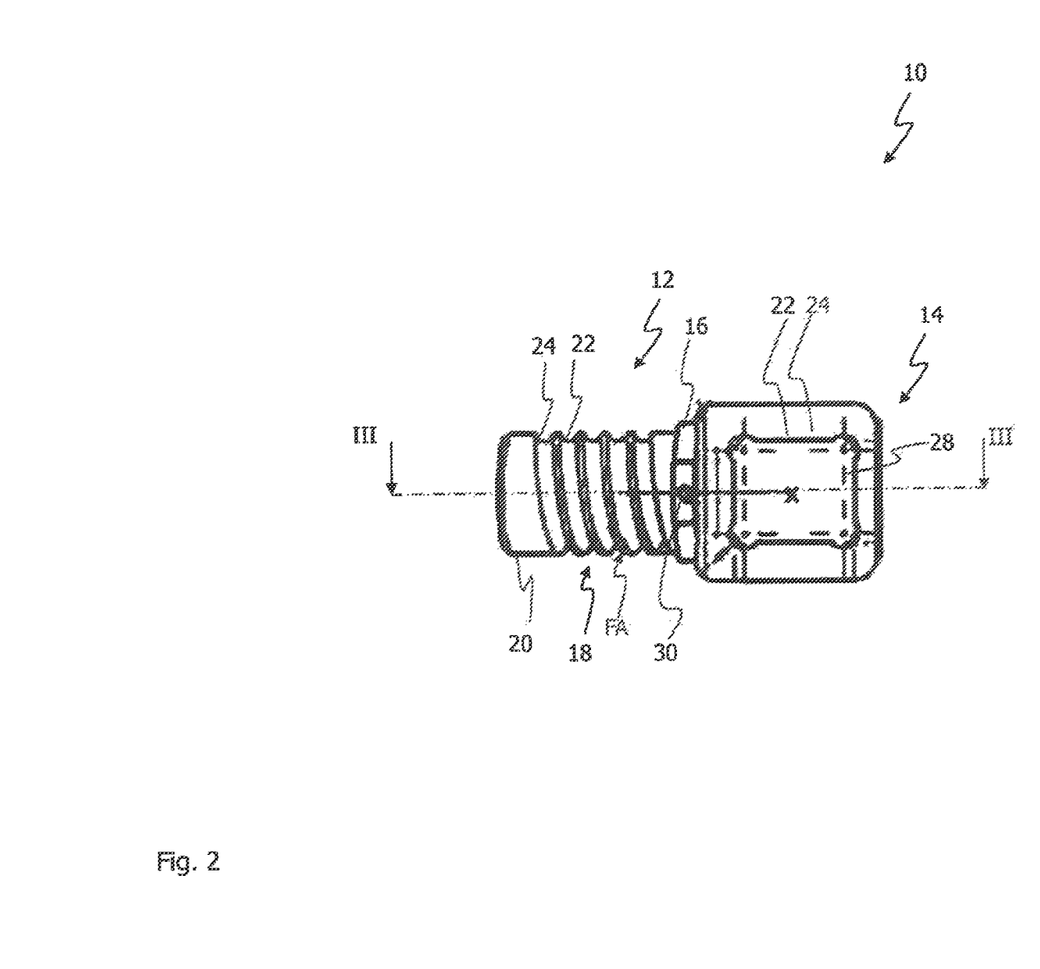
FIG. 2 shows a back view of the connecting member of FIG. 1.

FIG. 2 shows a backside view of the connecting member 10. As explained above, the connecting member 10 comprises the fastening porting 12, the attachment portion 14 and the step-like portion 16 connecting the fastening porting 12 and the attachment portion 14. The step-like portion 16 comprises a vent hole 30 that is connected to the fastening portion 12 in order to allow air to be exhausted from inside the object, to which the fastening portion 12 is fastened, during the fastening process (i.e., during the insertion of the fastening portion 12 into the object).

Figure 3:
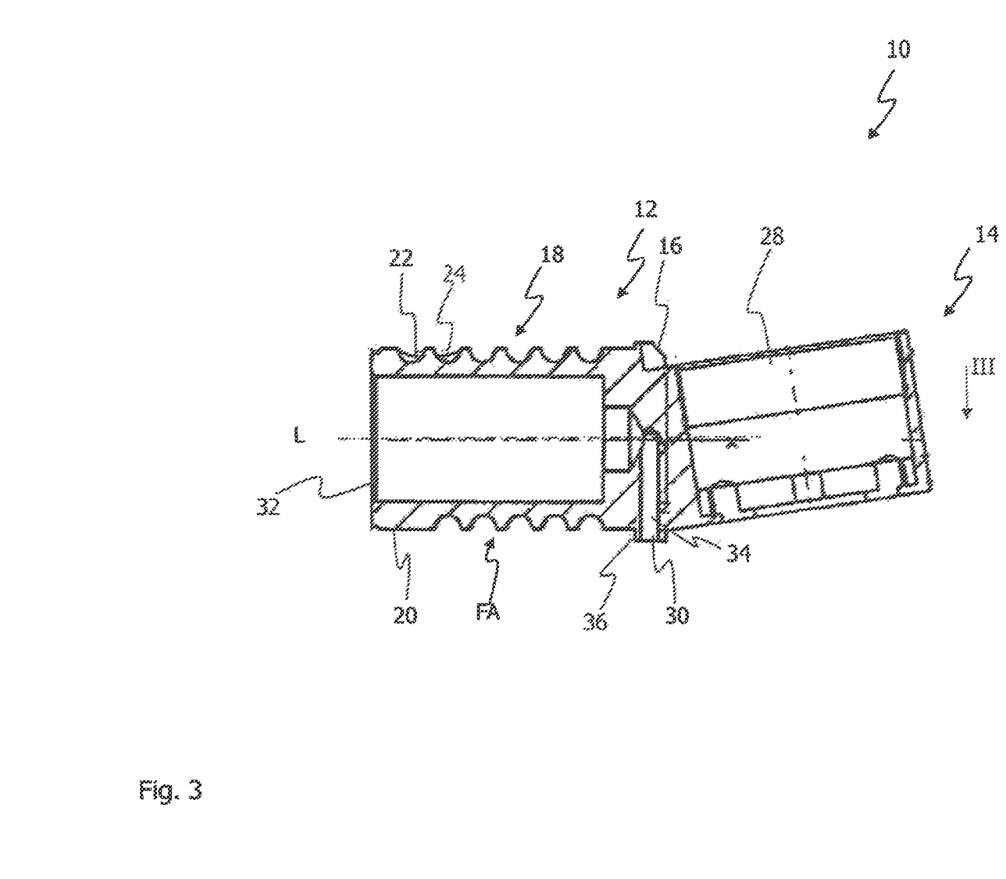
FIG. 3 shows a cross-sectional view along the cutting line III-III in FIG. 2.

FIG. 3 shows a sectional view representing a cut along the cutline III-III in FIG. 2. As apparent from FIG. 3, the fastening porting 12 comprises an opening 32 extending in a direction of the longitudinal axis L of the fastening portion 12 into the fastening portion 12. Thus, the fastening portion 12 is hollow. The opening 32 of the fastening portion 12 is connected to a vent channel 34 extending between the vent opening 30 and the opening 32 of the fastening portion 12. The vent channel 34 extends from the vent opening 30 at the step-like portion 16 into a body of the connecting member 10. The vent channel 34 connects the opening 32 of the fastening porting 12 to the vent opening 30 to allow air to be exhausted from the inside of the object when fastening the fastening portion 12 to an object (not shown), in particular when inserting the fastening portion 12 into an object. The step-like portion 16 comprises an abutment surface 36 for an abutment of the object to which the fastening porting 12 is fastened. The abutment surface 36 extends perpendicular to the longitudinal axis of the fastening porting 12.

Figure 4:
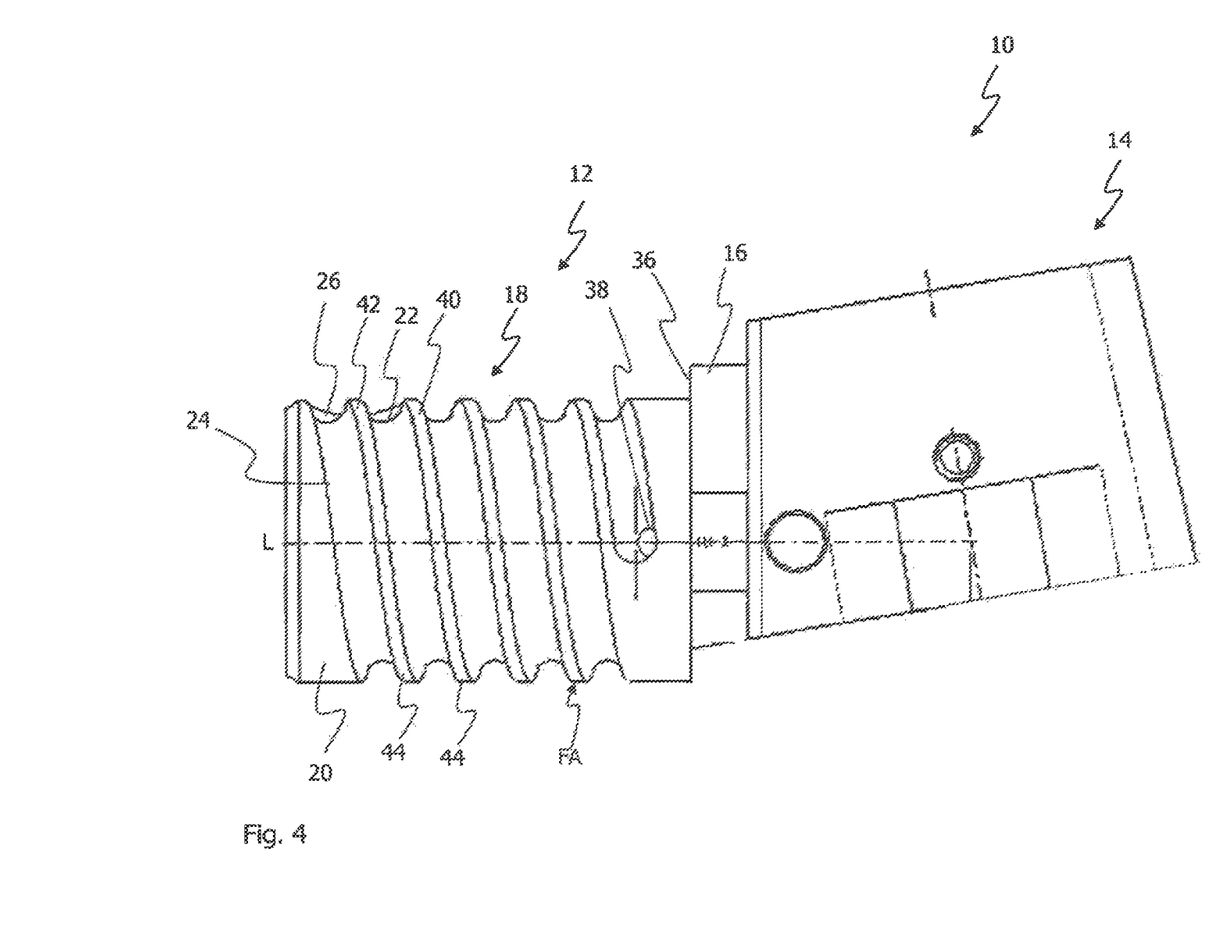
FIG. 4 shows a side view of the connecting member of the FIGS. 1 to 3.

FIG. 4 shows a side view of the connecting member 10. In FIG. 4, the fastening portion 12, the attachment portion 14 and the step-like portion 16 are again shown.

The fastening portion 12 comprises the open channel portion 18 at its outer circumferential surface. The open channel 18 extends groove- or recess-like at the outer circumferential surface 20 of the fastening portion 12. An adhesive may enter the open channel portion 18 via an exit opening 38 of an internal channel portion (not shown), which extends in the body of the connecting member 10. The open channel portion 18 is formed by a winding recess at the outer circumferential surface 20 of the fastening portion 12, which is defined by wall portions 40, 42. The wall portions 40 and 42 define the course of the windings of the helical portions 22, 24 of the open channel portion 18. Each wall portion 40, 42 comprises a surface section 44 of the outer circumferential surface 20. These surface sections 44 represent the top surface of each wall portion 40, 42. The surface sections 44 and the other remaining portions of the outer circumferential surface 20 are configured to come into contact with the object (not shown) to which the fastening portion 12 is to be fastened.

Figure 5:
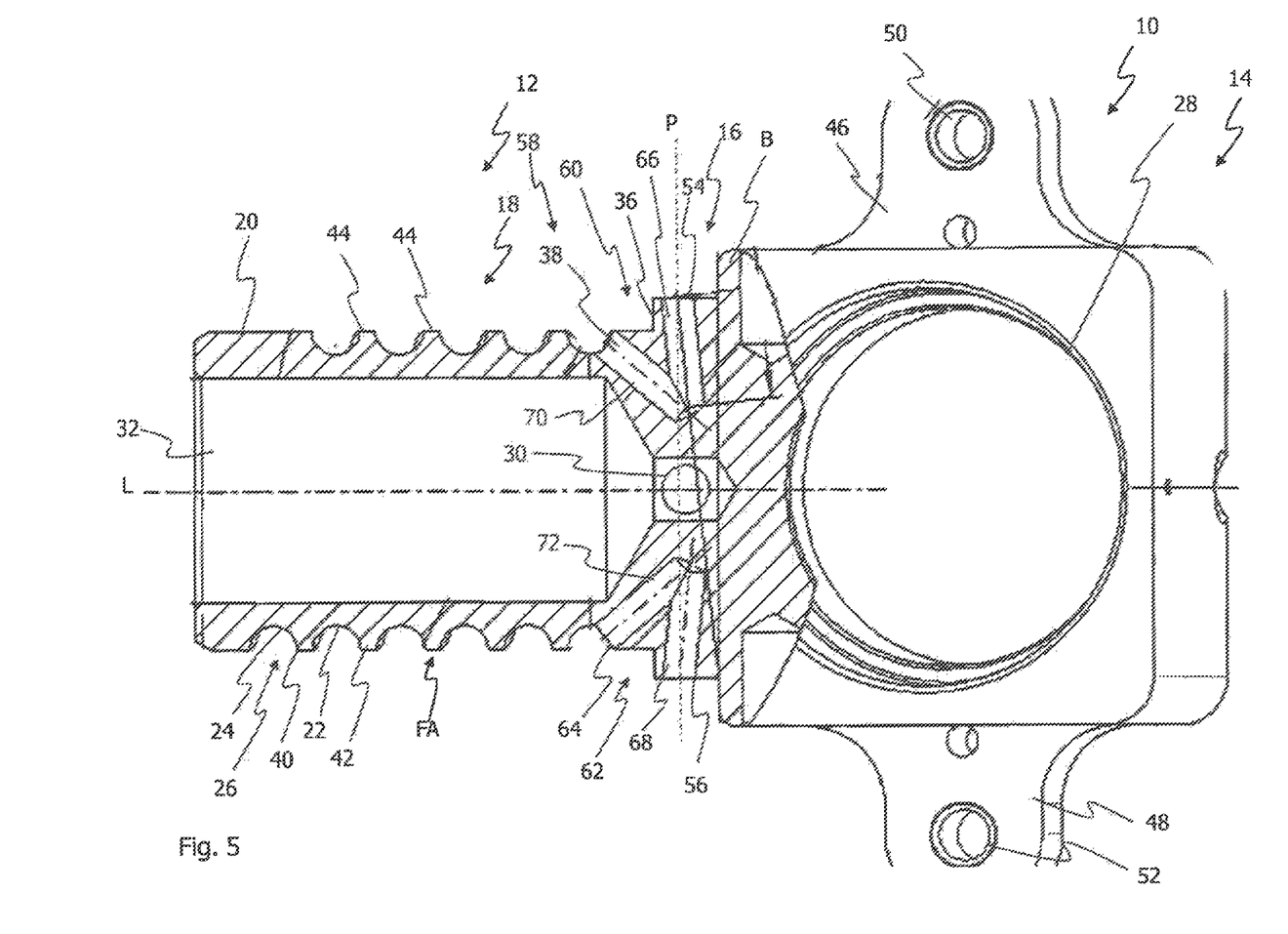
FIG. 5 shows a partially cutted view of a connecting member according to a second embodiment.

FIG. 5 shows a partially cuffed front view of a connecting member 10 according to a second embodiment. The attachment portion 14 of the connecting member 10 according to the embodiment shown in FIG. 5 is slightly different from the attachment portion shown in the FIGS. 1 to 4. In more detail, the attachment portion 14 according to the embodiment of FIG. 5 comprises two mounting portions 46 and 48, each comprising a mounting opening 50, 52 for mounting an object to the attachment portion 14. The fastening portion 12 and the step-like portion 16 of the embodiment shown in FIG. 5 are substantially identical to the fastening portion and the step-like portion of the first embodiment shown in the FIGS. 1 to 4. Accordingly, the following explanations made regarding the fastening portion 12 and the step-like portion 16 in connection with the embodiment shown in FIGS. 5 and 6 apply to the first embodiment shown in FIGS. 1 to 4 as well.

The connecting member 10 comprises a supply opening 54 for supplying adhesive and a discharge opening 56 for discharging a part of the adhesive. The redirecting portion 26 redirects the flow of adhesive coming from the supply opening 54 in the direction of the discharge opening 56. The supply opening 54 and the discharge opening 56 are arranged in the step-like portion 16. The supply opening 54 and the discharge opening 56 are connected by a channel 58. The channel 58 comprises the open channel portion 18 that forms a portion of the channel 58. The channel 58 further comprises a first internal channel portion 60 and a second internal channel portion 62. The first internal channel portion 60 connects the supply opening 54 to the open channel portion 18. The second internal channel portion 62 connects the open channel portion 18 to the discharge opening 56. The first internal channel portion 60 comprises an exit opening 38. Adhesive coming from the first internal channel portion 60 arrives via the exit opening 38 at the open channel portion 18. The second internal channel portion 62 comprises an entry opening 64 at which the adhesive enters the second internal channel portion 62 to be partly discharged at the discharge opening 56. The first and the second internal channel portions 60 and 62 extend in the body of the connecting member 10. The first and the second internal channel portions 60, 62 comprise a first internal channel section 66, 68 extending in radial direction into the body B of the fastening portion 12. Each of the first and second internal channel portions 60, 62 further comprises a second internal channel section 70, 72 extending between the first internal channel section 66, 68 and the exit opening 38 or the entry opening 64, respectively.

Adhesive is supplied to the channel 58 via the supply opening 54. The adhesive flows through the first internal channel portion 60 and enters the open channel portion 18 via the exit opening 38 of the first internal channel portion 60. The adhesive flows from the exit opening 38 through the first helical portion 22 of the open channel portion 18 to the redirecting portion 26 (see FIGS. 1 and 4) and from the redirecting portion 26 along the second helical portion 24 to the entry opening 64 of the second internal channel portions 62. The adhesive then flows through the second internal channel portion 62. When the adhesive leaks out from the second internal channel portion 62 (i.e., out from the channel 58) via the discharge opening 68, the supply of adhesive can be stopped, since the channel 58 is sufficiently filled with the adhesive.

The redirecting portion 26 is indicated in FIG. 5 by an arrow denoted by the reference numeral 26. The connecting member 10 has an axial extension. The redirecting portion 26 is located on the same side of the supply opening 54 and the discharge opening 56 with respect to the axial extension of the connecting member 10. The supply opening 54 and the discharge opening 56 are included in a plane P that extends perpendicular to the longitudinal axis L of the fastening portion 12. The supply opening 54 and the discharge opening 56 are arranged at the step-like portion 16, which is separate from the fastening portion 12. The supply opening 54 and the discharge opening 56 are arranged outside of the fastening portion 12. Since the supply opening 54 and the discharge opening 56 are provided in the step-like portion, the plane P is spaced apart from the fastening portion 12. The first internal channel sections 66 and 68 of the first internal channel 60 and the second internal channel 62 extend in the step-like portion 16. The same applies partly for the second internal channel sections 70, 72 extending to the open channel portion 18.

Figure 6:
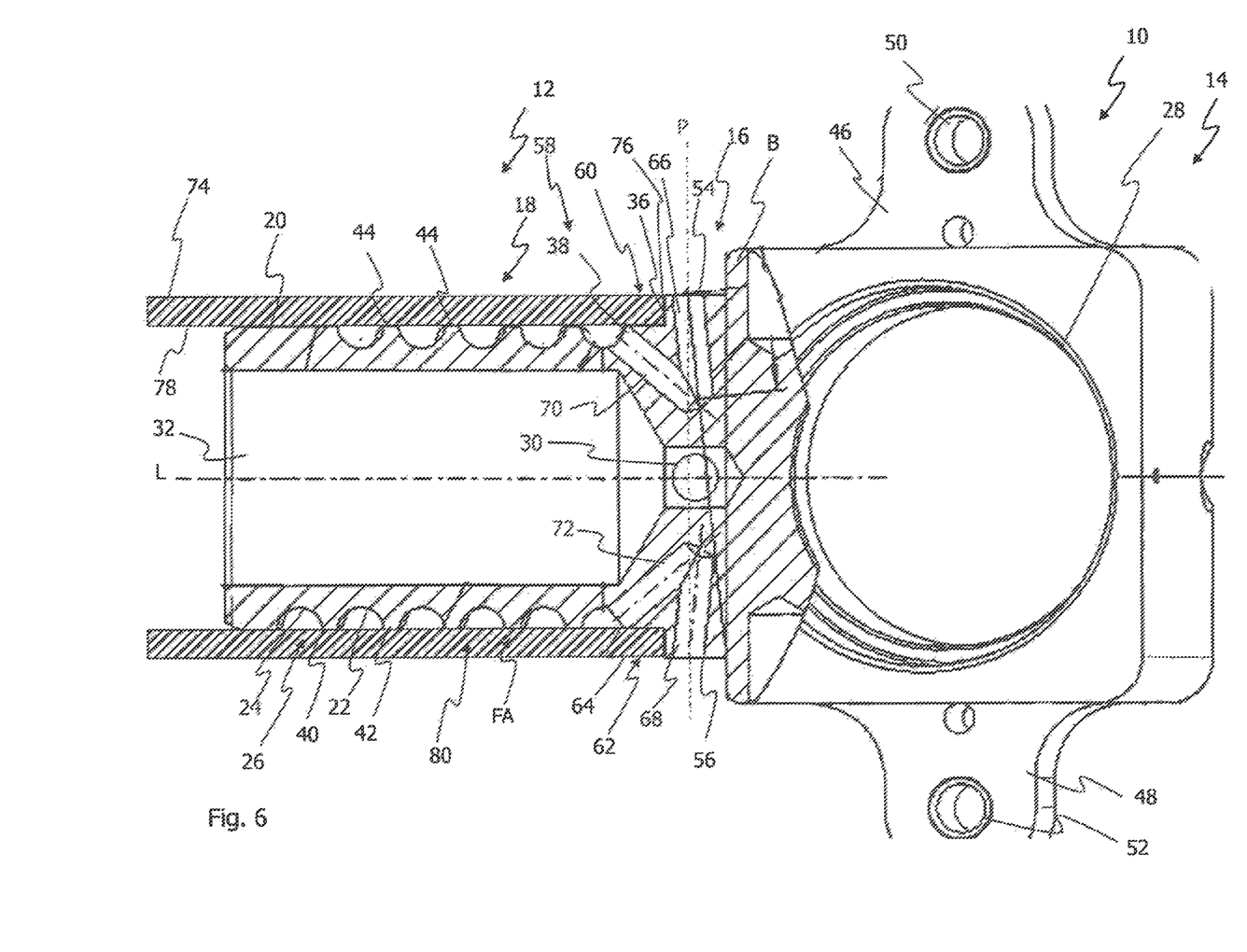
FIG. 6 shows a partially cutted view of the connecting member of FIG. 5 fastened to an object.

FIG. 6 shows a partially cuffed view of the connecting member 10 fastened with its fastening portion 12 to a tube-like object 74. The fastening portion 12 is inserted into the object 74. The end face 76 of the tube shaped object 74 abuts at the abutment surface 36 of the step-like portion 16. The inner circumferential surface 78 of the tube-shaped object 74 abuts at the outer circumferential surface 20 and the surface sections 44 of the outer circumferential surface 20. The open channel portion 18 is covered by the inner circumferential surface 78 of the object 74 to form a closed channel portion 80. Adhesive flowing through the closed channel portion 80 comes into contact with the connecting member 10 and with the object 74, to establish an adhering connecting between the connecting member 10 and the object 74.

Since the supply opening 54 and the discharge opening 56 are arranged outside of the fastening portion 12 and outside of the fastening area FA, adhesive can be supplied via the supplied opening 54 and discharged via the discharged opening 56 without any interference with the object 74. The adhesive is supplied via the supply opening 54 and flows through the first internal channel portion 60. The adhesive continues to flow through the first helical portion 22 of the open channel portion 18, which is now the closed channel portion 80, to the redirecting portion 26 arranged at the axial end of the fastening portion 12. The U-shaped redirecting portion 26 redirects the flow of adhesive coming from the supply opening 54 and the first helical portion 23 into the second helical portion 24. The adhesive then flows through the second helical portion 24 of the open channel portion 18 (i.e., the closed channel portion 80) to the second internal channel portion 62 and is discharged via the discharge opening 56. When the adhesive arrives at the discharge opening 56 and leaks out at the discharge opening 56, the supply of the adhesive can be stopped.

Figure 7:
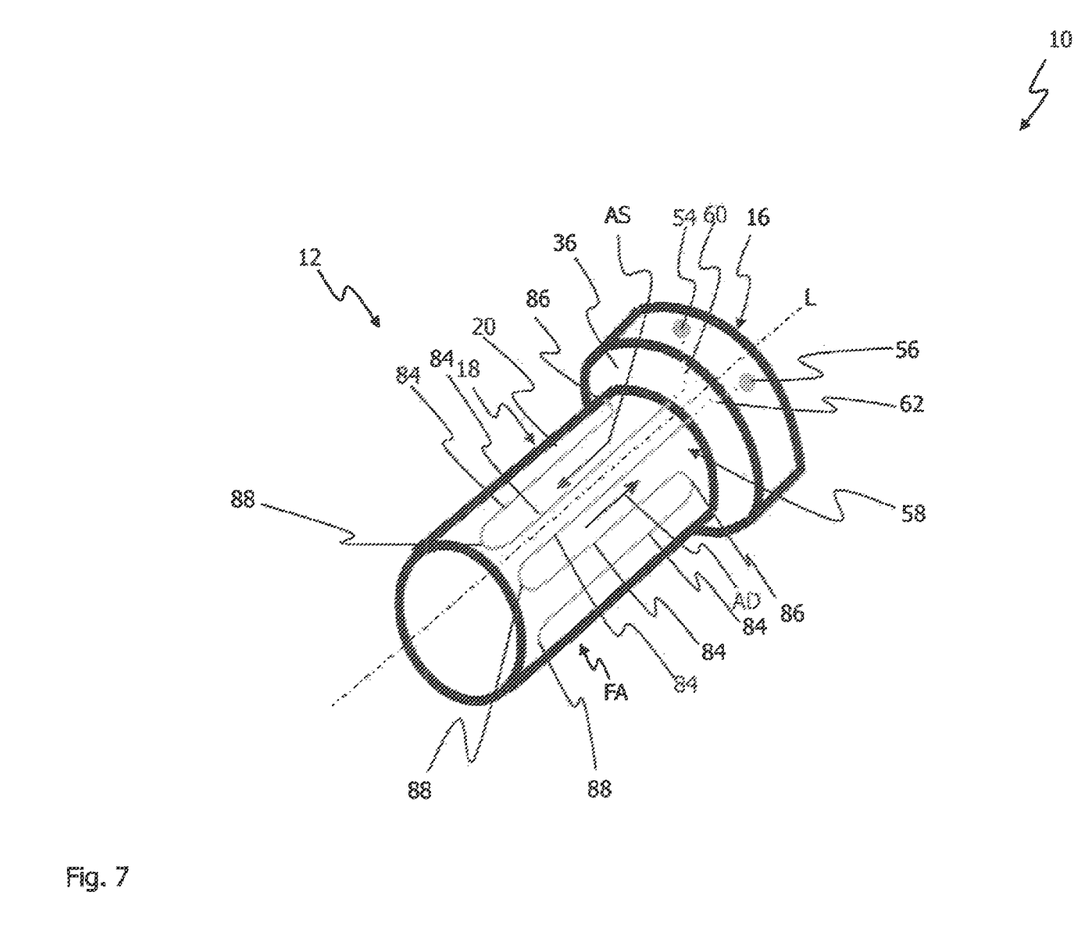
FIG. 7 shows a schematic perspective view of a connecting member according to a third embodiment.

FIG. 7 shows a schematic perspective view of a connecting member 10 according to a third embodiment. In FIG. 7 only the fastening portion 12 and the step-like portion 16 of the connecting member 10 according to the third embodiment are shown. Not shown in the schematic drawing of FIG. 7 is the attachment portion 14. The attachment portion 14 of the connecting member 10 according to the third embodiment may have the shape of the attachment portion of one of the first or the second embodiment (see FIGS. 1 to 6). The above explanations regarding the attachment portion 14 and regarding further details of the fastening portion 12 and the step-like portion 16 apply for the third embodiment of the connecting member 10 shown in FIG. 7 as well.

The connecting member 10 comprises the supply opening 54 for supplying adhesive and the discharge opening 56 for discharging a part of the adhesive. The supply opening 54 and the discharge opening 56 are arranged in the step-like portion 16. The supply opening 54 and the discharge opening 56 are arranged outside of the fastening portion 12.

The fastening portion 12 has a cylindrical shape with an essentially circular cross-section. The fastening portion 12 comprises a fastening area FA, which is configured to come into contact with the object (not shown) to be fastened. The fastening area FA is formed by the outer circumferential surface 20 of the fastening portion 12. The open channel portion 18 represents a portion of a channel for directing the flow of adhesive and extends on the outer circumferential surface 20 of the fastening porting 12. The supply opening 54 and the discharge opening 56 are connected by the channel 58. The channel 58 comprises the open channel portion 18 as well as a first internal channel portion 60 and a second internal channel portion 62. The first internal channel portion 60 connects the supply opening 54 to the open channel portion 18. The second internal channel portion 62 connects the open channel portion 18 to the discharge opening 56.

The open channel portion 18 comprises a meandering portion 82. The meandering portion 82 includes straight sections 84 which extend substantially parallel to each other and substantially parallel to the longitudinal axis L of the fastening portion 18. The open channel portion 18 further includes curved sections 86 and 88 which connect two subsequent or neighbouring straight sections 84 with each other. Each of the curved sections 86 and 88 forms a redirecting portion. The curved sections 86 are arranged at or close to the axial end of the fastening portion 12 connected to the step-like portion 16. The curved sections 88 are arranged at or close to the other or free axial end of the fastening portion 12. The curved sections 86 and 88 are arranged at opposite axial ends of the fastening portion 12. The straight sections 84 extend between the two axial ends of the fastening portion 12. The curved sections 86 and 88 have a U-shape and direct the flow of adhesive from one straight section 84 into the next straight section 84. The first internal channel portion 60 is connected to a straight section 84. The second internal channel portion 62 is connected to a further and different straight section 84. As indicated by the arrows AS and AD the direction of the flow of adhesive in two neighbouring straight sections 84 is opposite, since the curved sections 86 and 88 redirect the flow of adhesive.

The supply opening 54 and the discharge opening 56 are arranged outside of the fastening portion 12 and outside of the fastening area FA, so that adhesive can be supplied via the supplied opening 54 and discharged via the discharged opening 56 without any interference with the object. The adhesive is supplied via the supply opening 54 and flows through the first internal channel portion 60. The adhesive continues to flow through the meandering portion 82 of the open channel portion 18 with its straight sections 84 and its curved sections 86, 88. The adhesive then flows to the second internal channel portion 62 and is discharged via the discharge opening 56. When the adhesive arrives at the discharge opening 56 and leaks out at discharge opening 56, the supply of the adhesive can be stopped.

FIGS. 8 to 11 show schematic perspective views of a connecting member 10 according to a fourth embodiment. In FIGS. 8 to 11 only the fastening portion 12 of the connecting member 10 according to the fourth embodiment is shown. Not shown in the schematic drawings of FIGS. 8 to 11 is the attachment portion 14. The attachment portion 14 of the connecting member 10 according to the fourth embodiment may have the shape of the attachment portion of one of the first or the second embodiment (see FIGS. 1 to 6). The explanations regarding the attachment portion 14 and regarding further details of the fastening portion 12 as made with respect to the first and the second embodiments apply for the fourth embodiment of the connecting member 10 shown in FIGS. 8 to 11 as well.

Figure 8:
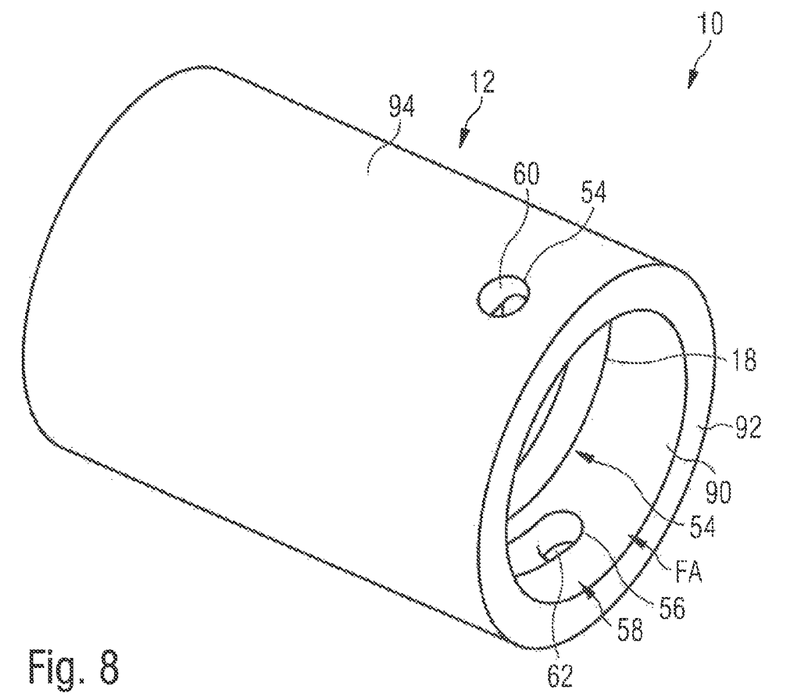
FIGS. 8 to 11 show different schematic perspective views of a connecting member according to a fourth embodiment.

The fastening portion 12 shown in FIG. 8 has a tube shape. The tube-shaped fastening portion 12 has an inner circumferential surface 90, an opening 92 for inserting the object (not shown) to be fastened to the fastening portion 12 and an outer circumferential surface 94. The fastening portion 12 comprises a fastening area FA, which is configured to come into contact with the object to be fastened. The fastening area FA is formed by the inner circumferential surface 90 of the fastening portion 12. On the inner circumferential surface 90 of the fastening portion 12 extends the open channel portion 18 representing a portion of a channel 58 for directing the flow of adhesive. The supply opening 54 and the discharge opening 56 are connected by the channel 58. The channel 58 comprises a first internal channel portion 60 and a second internal channel portion 62. The first internal channel portion 60 connects the supply opening 54 to the open channel portion 18. The second internal channel portion 62 connects the open channel portion to the discharge opening 56. The supply opening 54 and the discharge opening 56 are formed on an outer circumferential surface 94 of the fastening portion 12 and, thus, outside of the fastening area FA.

Figure 9:
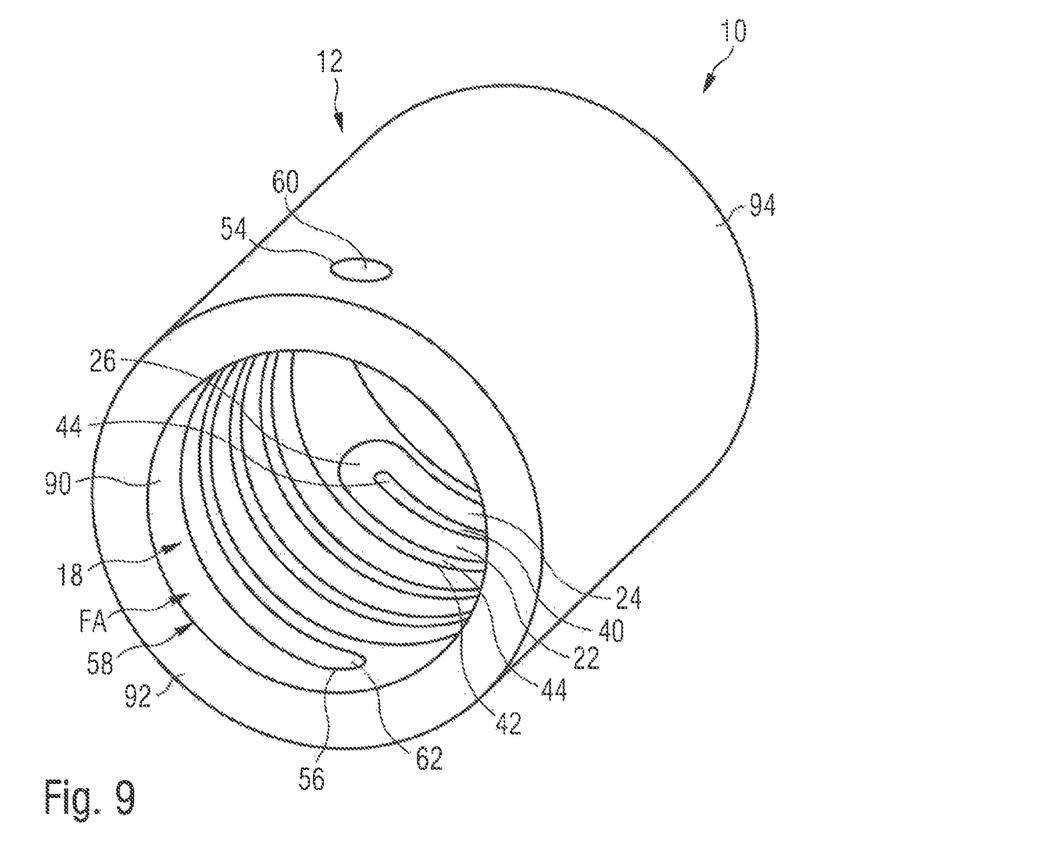

FIG. 9 shows a further schematic perspective view of the fastening portion 12 of the connecting member 10 according to the fourth embodiment. The open channel portion 18 extends on the inner circumferential surface 90 and connects the first internal channel portion 60 and the second internal channel portion 62. The open channel portion 18 comprises a first helical portion 22 and a second helical portion 24. The first helical portion 22 and the second helical portion 24 are connected by a redirecting portion 26. The redirecting portion 26 has a U-shape. The first helical portion 22 leads the flow of adhesive coming from the first internal channel portion 60 to the redirecting portion. The second helical portion 24 directs the flow of adhesive from the redirecting portion 26 in the direction of the second internal channel portion 62.

The open channel portion 18 is formed by a winding recess at the inner circumferential surface 90 of the fastening portion 12. The winding recess is defined by wall portions 40, 42. The wall portions 40 and 42 define the course of the windings of the helical portions 22, 24 of the open channel portion 18 at the inner circumferential surface 90. Each wall portion 40, 42 comprises a surface section 44 of the inner circumferential surface 90. These surface sections 44 represent the top surface of each wall portion 40, 42. The surface sections 44 and the other remaining portions of the inner circumferential surface are configured to come into contact with the object (not shown) to which the fastening portion 12 is to be fastened. The wall portions 40, 42 extend at least partly radially inwardly.

Figure 10:
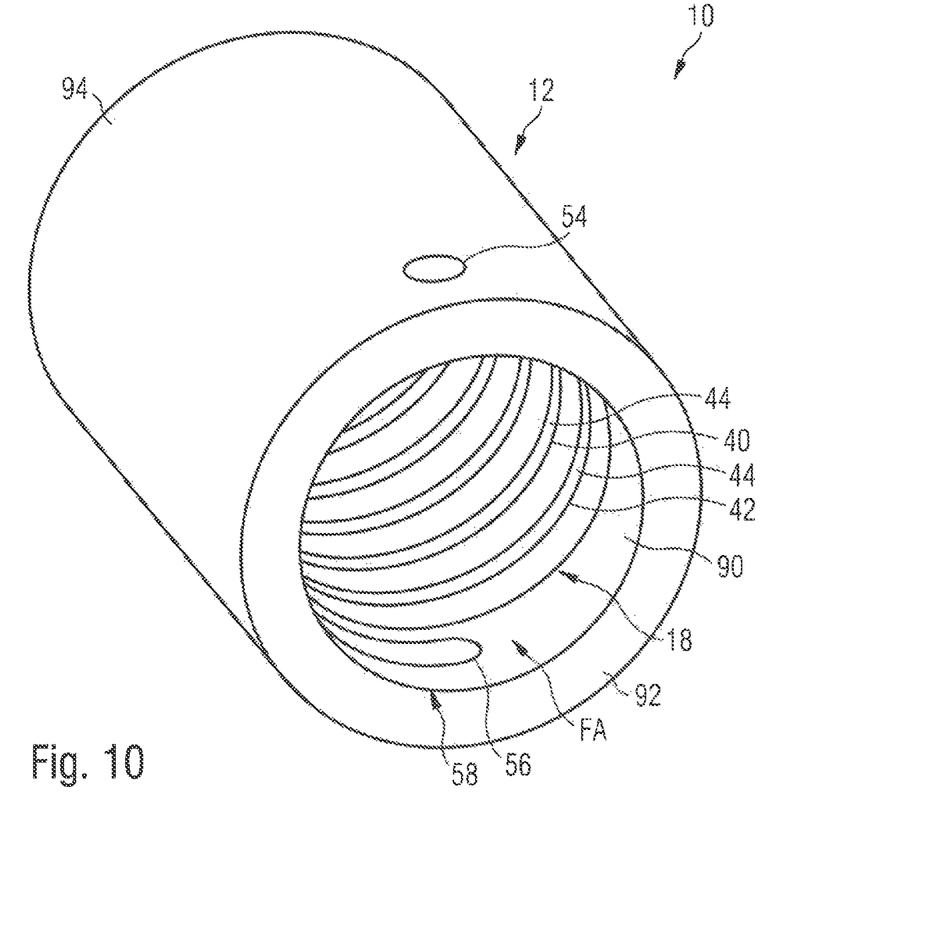

FIG. 10 shows a further schematic perspective view of the fastening portion 12 of the connecting member 10. FIG. 10 illustrates the open channel portion 18 extending on the inner circumferential surface 90 of the tube-shaped fastening portion 12.

Figure 11:
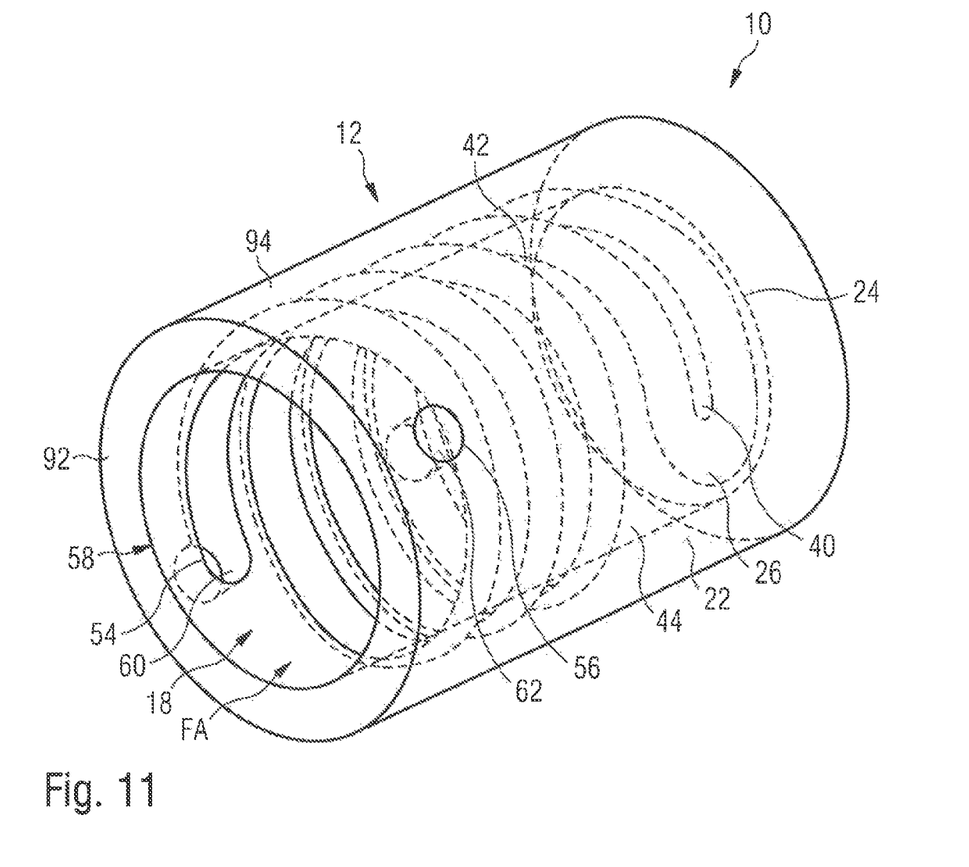

FIG. 11 shows a further schematic perspective view of the fastening portion 12, in which the fastening portion 12 is transparent to highlight the course of the channel 58. The channel 58 connects the supply opening 54 and the discharge opening 56. The first internal channel portion 60 and the second internal channel portion 62 have a substantially cylindrical shape and extend substantially in radial direction through the tube-shaped fastening portion 12 to the inner circumferential surface 90. The first internal channel portion 60 and the second internal channel portion 62 are connected by the open channel portion 18. The open channel portion 18 comprises the first helical portion 22 and the second helical portion 24, which are connected by the redirecting portion 26. The redirecting portion 26 has a U-shape for redirecting the flow of adhesive. The windings of the open channel portion 18 are formed by wall portions 40, 42.

An object (not shown) to be fastened to the fastening portion 12 is inserted into the opening 92 of the tube-shaped fastening portion 12. The outer circumferential surface of the object, which may have a rod or tube shape, abuts at the inner circumferential surface 90 and the surface sections 44 of the inner circumferential surface 90. The open channel portion 18 is covered by the outer circumferential surface of the object to form a closed channel portion. Adhesive flowing through the closed channel portion comes into contact with the connecting member 10 and with the object, to establish an adhering connection between the connecting member 10 and the object.

Since the supply opening 54 and the discharge opening 56 are arranged in radial direction outside of the fastening area FA at the outer circumferential surface 94 of the fastening portion 12, the adhesive can be supplied via the supply opening 54 and discharged via the discharge opening 56 without any interference with the object to be fastened. The adhesive is supplied via the supply opening 54 and flows through the first internal channel portion 60. The adhesive continues to flow through the first helical portion 22 of the open channel portion 18, which is now the closed channel portion, to the redirecting portion 26 arranged at the axial end of the fastening portion 12. The U-shaped redirecting portion 26 redirects the flow of adhesive coming from the supply opening 54 and the first helical portion 22 into the second helical portion 24. The adhesive then flows through the second helical portion 24 of the open channel portion 18 to the second internal channel portion 62 and is discharged via the discharge opening 56. When the adhesive arrives the discharge opening 56 and leaks out at the discharge opening 56, the supply of adhesive can be stopped.

The following explanations apply to all embodiments shown in the drawings and described above. Since the discharge opening 56 is arranged outside of the fastening portion 12 and/or outside of the fastening area FA of the fastening portion 12, it can be determined that enough adhesive has been supplied, when adhesive leaks out of the discharge opening 56. The quantity of adhesive is essential to achieve a reliable adhering connection between the fastening portion 12 and the object 74. In other words, when adhesive leaks out of the discharge opening 56, the closed channel portion 80 is sufficiently filled with adhesive to establish a reliable adhering connection between the fastening portion 12 and the object 74. Thus, with the connecting member 10, it can be ensured that enough adhesive has been supplied to securely fasten the fastening portion 12 to the object 74. By means of the open channel portion 18 forming together with the object 74 the closed channel portion 80, the adhesive is directed exactly in the area between the connecting member 10 and the inner circumferential surface 78 of the object 74 or between the connecting member 10 and the outer circumferential surface of the object. By doing so, a high quality of the adhering connection between the object 74 and the connecting member 10 can be ensured. Since the adhesive flows along the outer circumferential surface 20 of the fastening portion 12, the fastening portion 12 of the first to third embodiments can be made hollow. Thus, the connecting member 10 is light.

Moreover, due to the hollow fastening portion 12, the vent opening 30 can be easily be provided by establishing a connection between the opening 32 of the fastening portion 12 and the outside of the connecting member 10. The vent opening 30 allows air to be exhausted from inside the object 74, when the fastening portion 12 is inserted in the object 74, to facilitate the insertion of the fastening portion 12 into the object 74 and the entire connection process between the object 74 and the connecting member 10.

The features described in relation to the exemplary embodiments shown in the drawings can be readily combined to create further embodiments. It is apparent, therefore, that the present disclosure may be varied in many ways. Such variations are not regarded as a departure from the scope of the invention as defined by the claims appended hereto.

The invention claimed is:

1. A connecting member, comprising:
    a fastening portion configured to be fastened to an object by an adhesive, wherein the fastening portion comprises a fastening area configured to come into contact with the object to be fastened;
    at least one supply opening for supplying the adhesive and at least one discharge opening for discharging a part of the adhesive, wherein the at least one supply opening and the at least one discharge opening are arranged outside of the fastening portion or at least outside of the fastening area; and
    a channel connecting the at least one supply opening and the at least one discharge opening and configured to direct a flow of the adhesive, wherein the channel comprises at least one open channel portion that at least partly extends on a surface of the fastening portion and that comprises at least one redirecting portion configured to redirect the flow of the adhesive between the at least one supply opening and the at least one discharge opening,
    wherein the at least one open channel portion comprises at least one helical portion, wherein a first helical portion of the at least one helical portion is connected to the at least one redirecting portion and wherein a second helical portion of the at least one helical portion is connected to the at least one redirecting portion.

2. The connecting member according to claim 1, wherein the connecting member has an axial extension, and wherein the redirecting portion is axially located on a same side of the at least one supply opening and of the at least one discharge opening with respect to the axial extension of the connecting member.

3. The connecting member according to claim 1, wherein the at least one open channel portion extends on an outer circumferential surface of the fastening portion or on an inner circumferential surface of the fastening portion.

4. The connecting member according to claim 3, wherein the fastening area is formed by the outer circumferential surface or the inner circumferential surface of the fastening portion.

5. The connecting member according to claim 1, wherein the at least one channel includes a first internal channel portion and a second internal channel portion, both extending within the body of the connecting member.

6. The connecting member according to claim 5, wherein the first internal channel portion connects the at least one supply opening to the open channel portion, and wherein the second internal channel portion connects the at least one open channel portion and the at least one discharge opening.

7. The connecting member according to claim 1, wherein the at least one redirecting portion has a U-shape.

8. The connecting member according to claim 1, wherein the at least one supply opening and the at least one discharge opening are included in at least one plane, which extends perpendicular to a longitudinal axis of the fastening portion.

9. The connecting member according to claim 8, wherein the at least one plane is spaced apart from the fastening portion.

10. The connecting member according to claim 1, wherein the at least one supply opening and the at least one discharge opening are separated from the fastening portion by a step-like portion defining an abutment surface for an abutment of the object to be fastened to the fastening portion of the connecting member.

11. The connecting member according to claim 1, wherein the fastening portion has a cylindrical shape and is configured to be connected to the object having a rod, duct or tube shape.

12. The connecting member according to claim 1, wherein the connecting member comprises an attachment portion for attachment of an object to be connected to the other object by means of the connecting member.

13. A connecting member, comprising:
    a fastening portion configured to be fastened to an object by an adhesive, wherein the fastening portion comprises a fastening area configured to come into contact with the object to be fastened;
    at least one supply opening for supplying the adhesive and at least one discharge opening for discharging a part of the adhesive, wherein the at least one supply opening and the at least one discharge opening are arranged outside of the fastening portion or at least outside of the fastening area; and
    a channel connecting the at least one supply opening and the at least one discharge opening and configured to direct a flow of the adhesive, wherein the channel comprises at least one open channel portion that at least partly extends on a surface of the fastening portion and that comprises a redirecting portion configured to redirect the flow of the adhesive coming from the at least one supply opening to the at least one discharge opening, wherein the at least one open channel portion comprises at least one helical portion, a first helical portion of the at least one helical portion is connected to the at least one redirecting portion and wherein a second helical portion of the at least one helical portion is connected to the at least one redirecting portion.

14. A connecting method for connecting a connecting member with an object by an adhesive, wherein the connecting member comprises:
- a fastening portion configured to be fastened to the object by the adhesive, wherein the fastening portion comprises a fastening area configured to come into contact with the object to be fastened;
- at least one supply opening for supplying the adhesive and at least one discharge opening for discharging a part of the adhesive, wherein the at least one supply opening and the at least one discharge opening are arranged outside of the fastening portion at least outside of the fastening area; and
- a channel connecting the at least one supply opening and the at least one discharge opening and configured to direct a flow of the adhesive, wherein the channel comprises at least one open channel portion that at least partly extends on a surface of the fastening portion and that comprises at least one redirecting portion configured to redirect the flow of the adhesive between the at least one supply opening and the at least one discharge opening, wherein the at least one open channel portion comprises at least one helical portion, a first helical portion of the at least one helical portion is connected to the at least one redirecting portion and wherein a second helical portion of the at least one helical portion is connected to the at least one redirecting portion, wherein the method comprises the steps of:
- arranging the fastening portion of the connecting member at the object such that the at least one open channel portion is covered by a surface of the object to form a closed channel portion;
- supplying the adhesive via the at least one supply opening to the channel of the connecting member, wherein the adhesive flows through a first internal channel portion, the closed channel portion and a second internal channel portion to the at least one discharge opening, wherein the adhesive in the closed channel portion comes into contact with both the connecting member and the object, to establish an adhering connection between the connecting member and the object; and
- stopping adhesive supply when the adhesive leaks out the at least one discharge opening.

* * * * *